(12) United States Patent
Nunez

(10) Patent No.: US 12,457,002 B2
(45) Date of Patent: Oct. 28, 2025

(54) CABLE BRACKET AND GUIDE SYSTEM FOR AN ELECTRONIC DEVICE

(71) Applicant: UBICQUIA, INC., Fort Lauderdale, FL (US)

(72) Inventor: Cesar Eduardo Nunez, Miramar, FL (US)

(*) Notice: Subject to any disclaimer, the term of this patent is extended or adjusted under 35 U.S.C. 154(b) by 312 days.

(21) Appl. No.: 18/372,636

(22) Filed: Sep. 25, 2023

(65) Prior Publication Data

US 2024/0106487 A1    Mar. 28, 2024

Related U.S. Application Data

(60) Provisional application No. 63/409,742, filed on Sep. 24, 2022.

(51) Int. Cl.
*G02B 6/00* (2006.01)
*G02B 6/36* (2006.01)
*H02G 3/06* (2006.01)
*H04B 1/40* (2015.01)
*H04B 17/02* (2006.01)

(52) U.S. Cl.
CPC .................................... *H04B 1/40* (2013.01)

(58) Field of Classification Search
None
See application file for complete search history.

(56) References Cited

U.S. PATENT DOCUMENTS

| | | | | |
|---|---|---|---|---|
| 6,313,405 B1 * | 11/2001 | Rinderer | | H02G 3/0456 174/99 R |
| 6,394,398 B1 * | 5/2002 | Reed | | H05K 7/1491 248/57 |
| 6,613,981 B1 * | 9/2003 | Hathcock | | H05K 7/1449 174/72 A |
| 6,678,455 B1 * | 1/2004 | Knight | | G02B 6/38875 385/134 |
| 7,142,765 B2 * | 11/2006 | Rapp | | G02B 6/44524 385/137 |
| 7,155,104 B2 * | 12/2006 | Wentworth | | G02B 6/4439 385/134 |
| 8,081,858 B2 * | 12/2011 | Nair | | G02B 6/44524 385/136 |
| 8,273,989 B2 * | 9/2012 | Garza | | H02G 3/30 174/72 A |
| 8,459,604 B2 * | 6/2013 | Smith | | H02G 3/0608 248/57 |

(Continued)

*Primary Examiner* — Tuan A Tran
(74) *Attorney, Agent, or Firm* — Daniel C. Crilly

(57) ABSTRACT

A cable bracket includes multiple rail members and edge retention members. A first rail member is oriented in a first direction and supports a first cable section. A second rail member is coupled at one end to the first rail member and supports a second cable section. The second rail member is curved and provides a transition from the first direction to a second direction. A third rail member is coupled to the other end of the second rail member and supports a third cable section. At least part of the third rail member is oriented in the second direction. The edge retention members are coupled to at least one side edge of the third rail member and spaced along a length of the third rail member. The edge retention members retain at least part of the third cable section on a surface of the third rail member.

20 Claims, 9 Drawing Sheets

(56) References Cited

U.S. PATENT DOCUMENTS

| | | | | |
|---|---|---|---|---|
| 8,901,438 B2* | 12/2014 | Lewis, II | ........... | H05K 7/20009 |
| | | | | 174/559 |
| 9,209,609 B2* | 12/2015 | Kellerman | ............ | E04B 1/5812 |
| 9,357,110 B2* | 5/2016 | Wong | .................... | F16M 11/10 |
| 9,362,727 B2* | 6/2016 | Cardin | ................ | H02G 3/0608 |
| 9,793,693 B1* | 10/2017 | Handler | ............... | H02G 3/0456 |
| 9,810,861 B2* | 11/2017 | Thompson | ........... | G02B 6/3897 |
| 9,829,642 B2* | 11/2017 | Geens | ................. | G02B 6/2553 |
| 9,841,123 B1* | 12/2017 | White | ................. | H02G 3/0608 |
| 9,854,699 B2* | 12/2017 | Geng | ................... | G02B 6/4453 |
| 9,869,407 B2* | 1/2018 | McCarter | .................. | F16L 3/13 |
| 9,905,933 B2* | 2/2018 | Scheucher | ......... | H04B 7/15557 |
| 9,980,400 B2* | 5/2018 | Lewis, II | ................ | H05K 7/18 |
| 11,002,384 B2* | 5/2021 | Kellerman | ............ | H02G 3/0608 |
| 11,118,390 B2* | 9/2021 | Mueller | ................ | E05F 11/483 |
| 11,340,416 B2* | 5/2022 | Geens | ................. | G02B 6/3897 |
| 11,506,856 B2* | 11/2022 | Claessens | ............ | G02B 6/4477 |
| 11,927,821 B2* | 3/2024 | Vermeulen | ........... | G02B 6/4453 |
| 12,055,779 B2* | 8/2024 | Geens | ................. | G02B 6/44526 |
| 12,218,428 B2* | 2/2025 | Scheucher | ............ | H01Q 19/30 |
| 12,228,780 B2* | 2/2025 | Vermeulen | ........... | G02B 6/4455 |
| 12,284,780 B2* | 4/2025 | Anderson | ............ | H05K 7/1491 |
| 2003/0130010 A1* | 7/2003 | Monroe | ............... | H05K 5/0204 |
| | | | | 455/560 |
| 2015/0296666 A1* | 10/2015 | Soo Hoo | .............. | H05K 7/1491 |
| | | | | 361/818 |
| 2023/0189468 A1* | 6/2023 | Anderson | ............ | G02B 6/4452 |
| | | | | 385/136 |
| 2023/0288656 A1* | 9/2023 | Geens | ................. | G02B 6/4455 |
| 2023/0408784 A1* | 12/2023 | Bran de León | ...... | G02B 6/4444 |

* cited by examiner

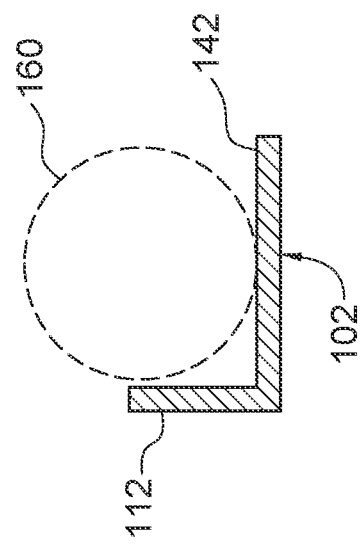
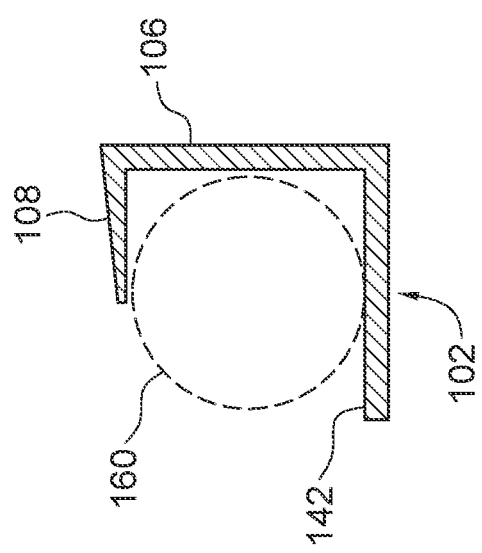

CABLE BRACKET AND GUIDE SYSTEM FOR AN ELECTRONIC DEVICE

CROSS-REFERENCE TO RELATED APPLICATIONS

The present application claims the benefit of and priority upon U.S. Provisional Patent Application No. 63/409,742, which was filed on Sep. 24, 2022, and is incorporated herein by this reference as if fully set forth herein.

TECHNICAL FIELD

The present disclosure relates generally to cable guide brackets and systems, and, more particularly, to a cable bracket and guide system that retains the cable, such as an antenna cable, in place.

BACKGROUND

Cable brackets are commonly used to organize and keep cables out of the way. There are numerous applications where cable organization is desired, particularly for cables that carry signals. While most people are aware of the need for routing cable between devices, the routing of cables within an electronic device is not often thought of by most people. But in many devices, cables are used to route signals from one component to another. Since device volume is often a concern, organizing the arrangement of cables is a consideration in minimizing the device volume.

Furthermore, for electronic devices that operate in higher frequency ranges, cables and their routing can have significant effects on the signals carried by the cables. This is particularly true when signal frequency is in gigahertz (GHz) ranges. For example, many Long-Term Evolution (LTE) bands operate in the 1.5 GHz to 2.6 GHz frequency range and cellular fifth generation (5G) bands operate at even higher frequencies. At these frequencies cable routing can affect signal performance, and the radio components have to be optimized based on a particular cable length and routing within the device. Thus, in the manufacture of electronic devices, such as small cell access nodes, Internet of Things (IoT) devices, and others, it is critical that the cables are identically routed in each manufactured device in order to have substantially similar radio frequency operation. Further, given the proximity of the cables to radio transceiver units and the antennas within such electronic devices, improperly routed cables can generate intermodulation products in the signals, resulting in out of band emissions exceeding acceptable levels and also possibly degrading received signals.

SUMMARY

In accordance with one exemplary embodiment of the present disclosure, a bracket that provides a guide path for a cable, such as an antenna cable or any other cable that may require more precise routing, includes multiple rail members and edge retention members. A first rail member is oriented in a first direction and configured to support a first section of the cable. A second rail member is coupled at a first end to the first rail member and configured to support a second section of the cable. The second rail member is curved and provides a transition from the first direction to a second direction (e.g., a 45-degree transition, a 90-degree transition, or any other directional transition). A third rail member is coupled to a second end of the second rail member and configured to support a third section of the cable. At least part of the third rail member is oriented in the second direction. The edge retention members are coupled to at least one side edge of the third rail member and spaced along a length of the third rail member. The edge retention members are oriented so as to retain at least part of the third section of the cable on a surface of the third rail member. For example, the edge retention members may be oriented substantially perpendicular to the surface of the third rail member. Alternatively, the edge retention members may be oriented at other angles relative to the surface of the third rail member so long as such angles are adequate to retain at least part of the third section of the cable on the surface of the third rail member without crimping or pinching the cable. The edge retention members may be integrated with (e.g., molded), attached to, or otherwise coupled to the third rail member. According to one embodiment, the entire cable bracket may be a single molded, non-conductive, rigid plastic component.

According to an alternative exemplary embodiment of the present disclosure, the edge retention members may be located on both side edges of the third rail member. In one exemplary embodiment, the edge retention members are located on both side edges of the third rail member in an alternating manner so as to form gaps between each pair of edge retention members on a particular side edge of the third rail member. Additionally, the lengths of the edge retention members may be different on one side edge of the third rail member than on the other side edge. The gaps between the edge retention members may allow finger or tool access to the cable from a side of the third rail member.

According to another alternative exemplary embodiment of the present disclosure, the cable bracket may also include a plurality of cover members coupled to at least two of the edge retention members. The cover members are oriented so as to reside over at least part of a width of the surface of the third rail member. For example, each cover member may be an extension or hood extending from a top edge of the edge member to or with which the cover member is integrated (e.g., molded), attached, or otherwise coupled. The cover members may prevent the cable from falling off the third rail member in the event the electronic device that includes the cable bracket is turned upside down, such as during shipping or installation. In one exemplary embodiment, the third rail member is the longest of the rail members.

Edge retention members and/or cover members may also be coupled to one or more of the other rail members. For example, a curved edge retention member may be coupled to one side edge or each side edge of the second rail member, where the curved edge retention member is oriented so as to retain at least part of the second section of the cable on a surface of the second rail member. A cover member may be coupled to a top edge of the curved edge retention member and be oriented so as to reside over at least part of a width of a surface of the second rail member.

According to another alternative embodiment, the cable bracket may further include one or more support legs that are attachable to a support structure, such as part of a housing (e.g., the floor, ceiling, or cover) of an electronic device in which the cable bracket is installed. The support legs may be coupled to the third rail member and be used in circumstances where the third rail member is elevated relative to a floor or ceiling of the electronic device's housing. The support legs may include base portions that define openings through which shanks of fasteners, such as screws or bolts, may be inserted to attach and secure the support legs to the support structure.

According to yet another alternative embodiment, the cable bracket may include an alignment member spaced apart from and substantially parallel to the first rail member. In such case, the alignment member may define an alignment passage for the cable. For example, the alignment member may be positioned between a cable termination point, such as where the cable is secured (e.g., soldered, glued, connected to a connector, etc.) to a printed circuit board, and the first rail member to guide the cable from the termination point to the first rail member. The alignment member may be used where inclusion of another rail member from the termination point to the first rail member is not practical or feasible. The alignment member may include or define an opening or another passage (e.g., a recess or other guide structure) through which the cable may pass to ensure the cable section to be carried by the first rail section approaches the first rail section at a desired location and angle. The alignment member, the first rail member, and/or the second rail member may be included on or form part of a panel member, which may reside adjacent to a module or printed circuit board at which one end of the cable is terminated. For example, where the module is an antenna element, the panel member of the cable bracket may be positioned adjacent to the module thereby positioning the alignment member, the first rail member, and/or the second rail member in desired positions for cable routing. The panel member provides a predetermined support structure for whichever cable bracket member or members (e.g., the alignment member, the first rail member, and/or the second rail member) are integrated with, attached to, or otherwise coupled to the panel member.

According to another alternative embodiment, a guide system for an antenna cable that is coupled at one end to an antenna element includes an antenna bracket and a cable bracket. The antenna bracket supports the antenna element. The cable bracket includes multiple rail members and edge retention members. A first rail member is spaced apart from the antenna bracket, oriented in a first direction, and configured to support a first section of the cable. A second rail member is coupled at a first end to the first rail member and configured to support a second section of the antenna cable. The second rail member is curved and provides a transition from the first direction to a second direction (e.g., a 45-degree transition, a 90-degree transition, or any other desired directional transition). A third rail member is coupled to a second end of the second rail member and configured to support a third section of the antenna cable. At least part of the third rail member is oriented in the second direction. The edge retention members are coupled to one or both side edges of the third rail member and are spaced along a length of the third rail member. The edge retention members are oriented so as to retain at least part of the third section of the antenna cable on a surface of the third rail member. For example, the edge retention members may be oriented substantially perpendicular to the surface of the third rail member. Alternatively, the edge retention members may be oriented at other angles relative to the surface of the third rail member so long as such angles are adequate to retain at least part of the third section of the antenna cable on the surface of the third rail member without crimping or pinching the antenna cable. The edge retention members may be integrated with (e.g., molded), attached to, or otherwise coupled to the third rail member. According to one embodiment, the cable bracket may be a molded, non-conductive, rigid plastic component.

According to an alternative embodiment, the antenna bracket may include a retention clip. When included, the retention clip retains a portion of the antenna cable in a fixed position after the antenna cable is connected (e.g., soldered) to the antenna element. The retention clip functions to reduce or eliminate stress imposed on the area at which the antenna cable connects to the antenna element during routing of the remainder of the antenna cable through the rest of the cable guide system.

According to yet another alternative embodiment, the cable bracket of the guide system may include an alignment member spaced apart from and substantially parallel to the first rail member. In such a case, the alignment member may define an alignment passage for the antenna cable. For example, the alignment member may be positioned between a cable termination point, such as where the antenna cable is secured (e.g., soldered, glued, connected to a connector, etc.) to the antenna element, and the first rail member to guide the antenna cable from the termination point to the first rail member. The alignment member may be used where inclusion of another rail member from the termination point to the first rail member is not practical or feasible. The alignment member may include or define an opening or another passage (e.g., a recess or other guide structure) through which the antenna cable may pass to ensure the antenna cable section to be carried by the first rail section approaches the first rail section at a desired location and angle. The alignment member, the first rail member, and/or the second rail member may be included on or form part of a panel member, which may reside adjacent to the antenna bracket. The panel member provides a predetermined support structure for whichever cable bracket member or members (e.g., the alignment member, the first rail member, and/or the second rail member) are integrated with, attached to, or otherwise coupled to the panel member.

According to another alternative exemplary embodiment of the present disclosure, the cable bracket of the guide system may also include a plurality of cover members coupled to at least two of the edge retention members. The cover members are oriented so as to reside over at least part of a width of the surface of the third rail member. For example, each cover member may be an extension or hood extending from a top edge of the edge member to or with which the cover member is integrated (e.g., molded), attached, or otherwise coupled. The cover members may prevent the cable from falling off the third rail member in the event the electronic device that includes the guide system is turned upside down, such as during shipping or installation. In one exemplary embodiment, the third rail member is the longest of the rail members.

Edge retention members and/or cover members may also be coupled to one or more of the other rail members. For example, a curved edge retention member may be coupled to one side edge or each side edge of the second rail member, where the curved edge retention member is oriented so as to retain at least part of the second section of the cable on a surface of the second rail member. A cover member may be coupled to a top edge of the curved edge retention member and be oriented so as to reside over at least part of a width of a surface of the second rail member.

According to another alternative embodiment, the cable bracket of the guide system may further include one or more support legs that are attachable to a support structure, such as part of a housing (e.g., the floor, ceiling, or cover) of an electronic device in which the guide system is installed. The support legs may be coupled to the third rail member and be used in circumstances where the third rail member is elevated relative to a floor or ceiling of the electronic device's housing. The support legs may include base portions that define openings through which shanks of fasteners, such as screws or bolts, may be inserted to attach and secure the support legs to the support structure.

According to yet another alternative embodiment, an electronic device, such as a small cell access node device, an IoT device, or an industrial IoT (IIoT) device, includes a housing, an antenna element, an antenna cable, an antenna bracket, and a cable bracket. The antenna cable connects to the antenna element at one end and may include an attached connector at another end. The antenna bracket is positioned within the housing and supports the antenna element. The cable bracket is also positioned within the housing and includes multiple rail members and edge retention members. A first rail member is spaced apart from the antenna bracket, oriented in a first direction, and configured to support a first section of the cable. A second rail member is coupled at a first end to the first rail member and configured to support a second section of the antenna cable. The second rail member is curved and provides a transition from the first direction to a second direction (e.g., a 45-degree transition, a 90-degree transition, or any other desired directional transition). A third rail member is coupled to a second end of the second rail member and configured to support a third section of the antenna cable. At least part of the third rail member is oriented in the second direction. The edge retention members are coupled to one or both side edges of the third rail member and are spaced along a length of the third rail member. The edge retention members are oriented so as to retain at least part of the third section of the antenna cable on a surface of the third rail member. For example, the edge retention members may be oriented substantially perpendicular to the surface of the third rail member. Alternatively, the edge retention members may be oriented at other angles relative to the surface of the third rail member so long as such angles are adequate to retain at least part of the third section of the antenna cable on the surface of the third rail member without crimping or pinching the antenna cable. The edge retention members may be integrated with (e.g., molded), attached to, or otherwise coupled to the third rail member. According to one embodiment, the cable bracket may be a molded, non-conductive (e.g., plastic) component.

In an alternative embodiment, the electronic device may include multiple antenna elements, multiple antenna cables, and multiple antenna brackets, such as where the electronic device uses a 2×2, 4×4, or 8×8 multiple-input-multiple-output (MIMO) antenna element arrangement. In such a case, the electronic device may include one or more cable brackets to at least partially route one or more of the antenna cables between its associated antenna element and an attachment point, such as a radio transceiver.

In accordance with further exemplary embodiments of the present disclosure, there is provided an antenna cable bracket for routing an antenna cable in a small cell access node device that includes a top rail that extends horizontally from a first end along a length to a panel member. The top rail defines a first side and a second side and a width from the first side to the second side in a horizontal direction perpendicular to the direction of the length of the top rail. The panel member is disposed on the second side of the antenna cable bracket in a vertical plane that is parallel to direction of the length of the top rail. The antenna cable bracket also includes a plurality of retention tabs that extend upward from the top surface of the top rail. At least some of the plurality of retention tabs are disposed along the first side of the top rail, and at least some others of the plurality of retention tabs disposed along the second side. The antenna cable bracket further includes some of the plurality of retention tabs having a horizontal extension that extends over the top surface of the top rail. The antenna cable bracket further includes a curved guide surface that extends from the panel member from the second side to the first side, and which continues from the top surface of the top rail and turns downward along a curve to meet a vertical wall that extends from the panel member toward the first side. The antenna cable bracket further includes an alignment wall oriented vertically and which extends from the panel member toward the first side, and which has a diminished portion configured to allow an antenna cable to pass the alignment wall. The antenna cable bracket further includes a support leg depending downward from the top rail at a point along the top rail between the first end and panel member, and having a fastener coupling at a bottom of the support leg.

In accordance with some embodiment of the disclosure, there is provided an antenna cabling system, which includes an antenna cable bracket having a top rail having a first end. The top rail extends in a lengthwise direction from the first end to a panel member at an opposite end of the top rail. The top rail has a width in a horizontal direction perpendicular to the lengthwise direction from a first side of the antenna cable bracket to a second side of the antenna cable bracket. The panel member is vertically oriented in a plane that is parallel to the lengthwise direction and disposed at the second side of the antenna cable bracket. The antenna cabling system also includes a first antenna bracket having a vertical orientation and which is disposed in a vertical plane partly under a portion of the top rail such that a portion of the top rail from the first end sits on a top of the first antenna bracket. The antenna cabling system also includes a second antenna bracket disposed at the panel member. The second antenna bracket has a vertical orientation and is disposed in a vertical plane parallel with the vertical plane of the first antenna bracket. The antenna cabling system also includes a first antenna cable from a first connector to the first antenna bracket, and a second antenna cable which runs from a second connector over a top surface of the top rail of the antenna bracket from the first end of the top rail the panel member. The second antenna cable continues over a curved guide surface that extends from the panel member is a direction perpendicular to the plane in which the panel member is oriented towards the first side of the antenna cable bracket and which turns downward. The second antenna cable continues from a bottom of the curved guide surface horizontally to connect to a vertically oriented planar antenna element on the second antenna bracket.

In accordance with some embodiment of the disclosure, there is provided an access node device, which includes a housing having a first side and a second side, and at each of the first and second sides there is disposed an antenna cabling system. The antenna cabling system includes an antenna cable bracket having a top rail having a first end. The top rail extends in a lengthwise direction from the first end to a panel member at an opposite end of the top rail. The top rail has a width in a horizontal direction perpendicular to the lengthwise direction from a first side of the antenna cable bracket to a second side of the antenna cable bracket. The panel member is vertically oriented in a plane that is parallel to the lengthwise direction and disposed at the second side of the antenna cable bracket. The antenna cabling system also includes a first antenna bracket having a vertical orientation and which is disposed in a vertical plane partly under a portion of the top rail such that a portion of the top rail from the first end sits on a top of the first antenna bracket. The antenna cabling system also includes a second antenna bracket disposed at the panel member. The second antenna bracket has a vertical orientation and is disposed in a vertical plane parallel with the vertical plane of the first antenna bracket. The antenna cabling system also includes a first antenna cable from a first connector to the first antenna bracket, and a second antenna cable which runs from a second connector over a top surface of the top rail of the antenna bracket from the first end of the top rail the panel member. The second antenna cable continues over a curved guide surface that extends from the panel member is a direction perpendicular to the plane in which the panel member is oriented towards the first side of the antenna cable bracket and which turns downward. The second antenna cable continues from a bottom of the curved guide surface horizontally to connect to a vertically oriented planar antenna element on the second antenna bracket.

Although the present disclosure illustrates and describes an antenna cable bracket for a small cell access node device, it is, nevertheless, not intended to be limited to the details shown because various modifications and structural changes may be made therein without departing from the spirit of the disclosure and while remaining within the scope and range of equivalents of the claims. Additionally, well-known elements of the invention will not be described in detail or will be omitted so as not to obscure the relevant details of the invention.

Features that are considered characteristic of the invention are set forth in the appended claims. As required, detailed embodiments of the small cell housing are disclosed herein; however, it is to be understood that the disclosed embodiments are merely exemplary, and the housing may be embodied in various forms. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather, to provide an understandable description of the disclosure. While the specification concludes with claims defining the features of the invention, it is believed that the claimed invention will be better understood from a consideration of the following description in conjunction with the drawing figures, in which like reference numerals are carried forward. The figures of the drawings are not drawn to scale.

The terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used in this description, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes and cannot be construed as indicating or implying relative importance.

As used in this description, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the device. Those skilled in the art can understand the specific meanings of the above-mentioned terms in the embodiments of the present disclosure according to the specific circumstances.

In the absence of any specific clarification related to its express use in a particular context, where the term "substantially" in any grammatical form is used as a modifier in the present disclosure and any appended claims (e.g., to modify a structure, a dimension, a measurement, or some other characteristic), it is understood that the characteristic may vary by up to 30 percent. For example, an element or characteristic thereof may be described as being "substantially identical" to another element or characteristic. In such a case, the two elements or characteristics may be identical or vary to within 30 percent of their respective dimensions.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

FIGS. 9A and 9B show cutaway views of the top rail of the antenna cable bracket of FIG. 1 along the lines A-A' and B-B', in accordance with some exemplary embodiments of the present disclosure.

DETAILED DESCRIPTION

Figure 1:
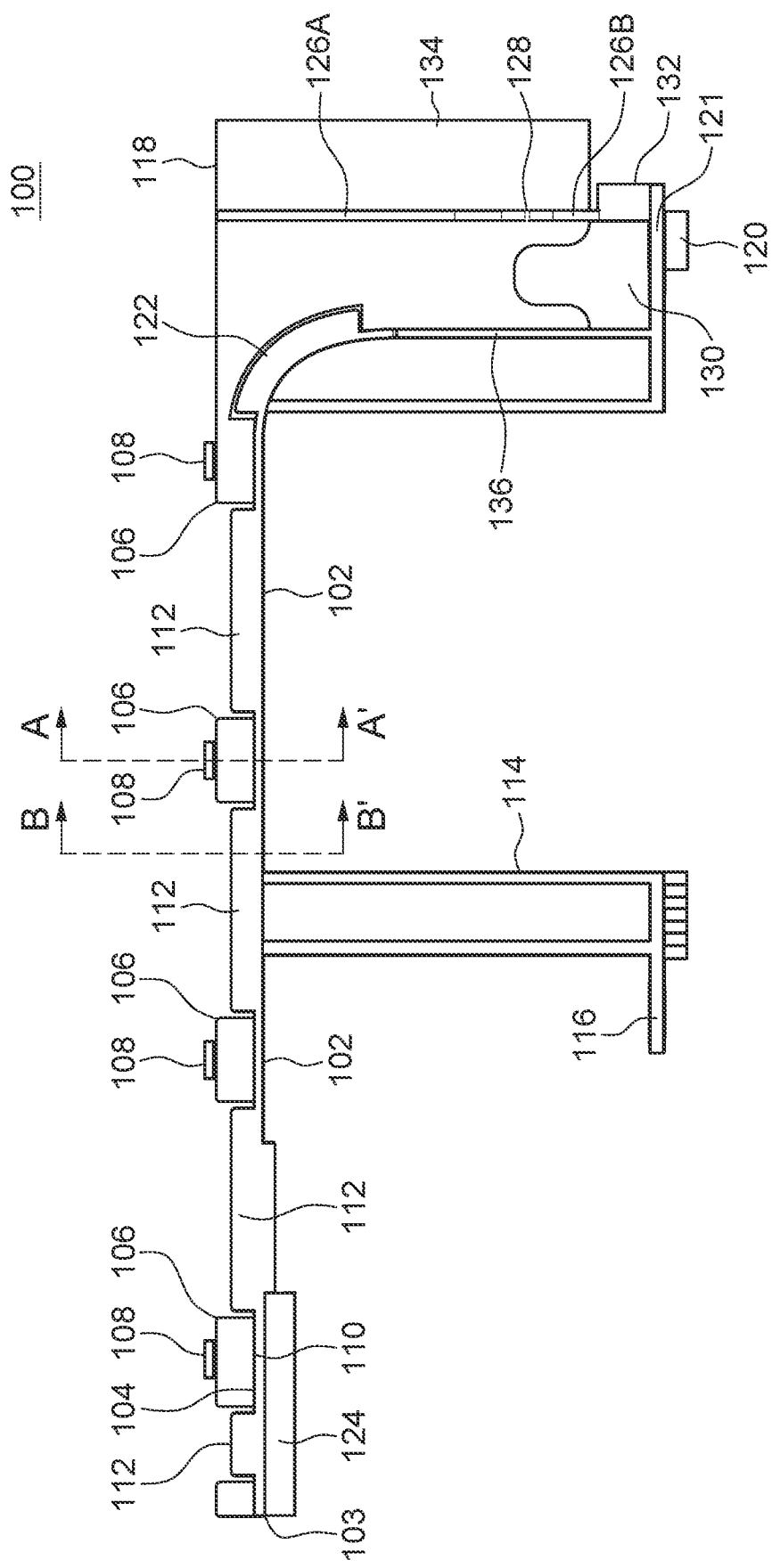
FIG. 1 is a first side view of a cable bracket for use in an electronic device, in accordance with some exemplary embodiments of the present disclosure.
Figure 2:
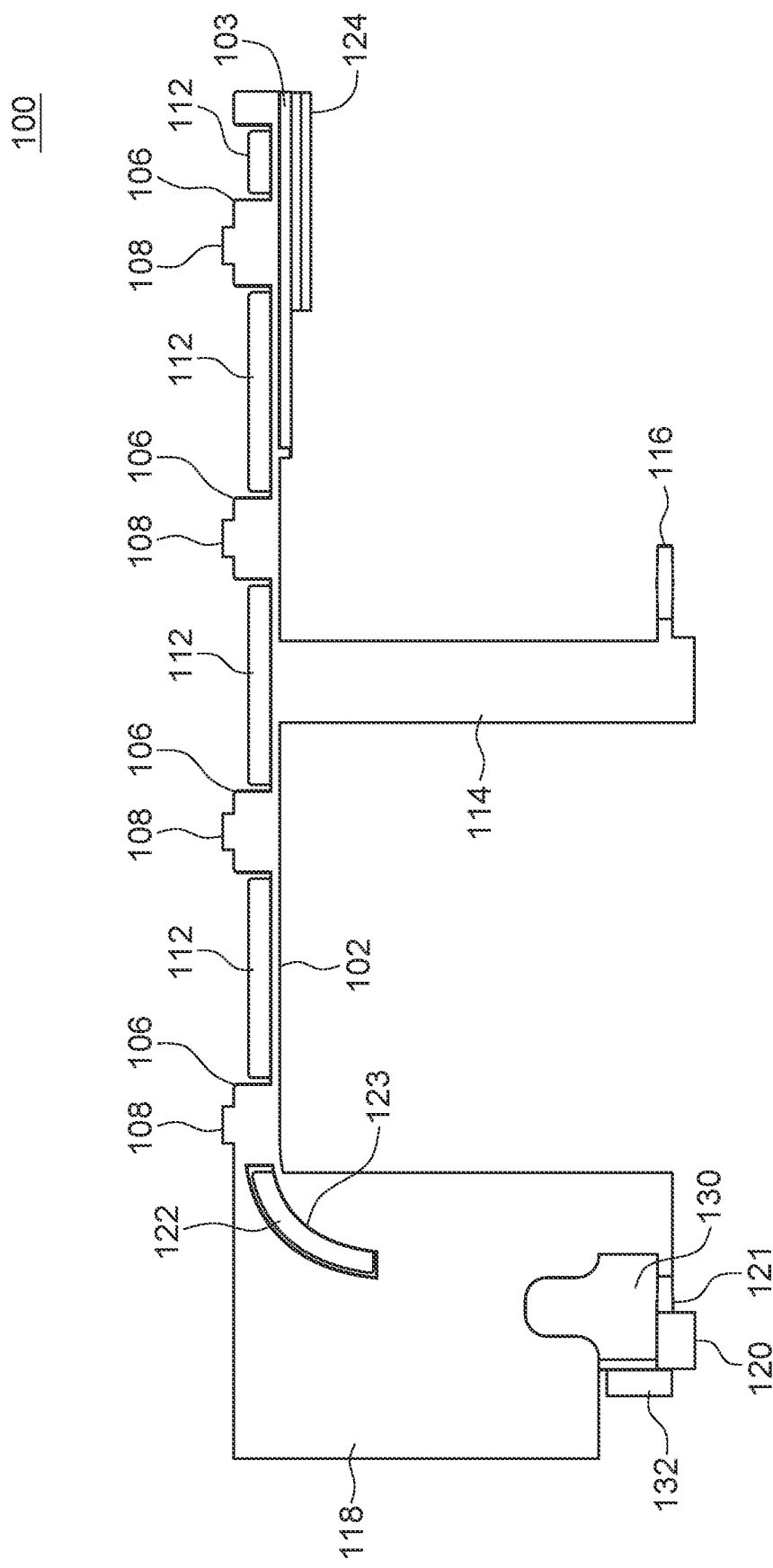
FIG. 2 is a second side view showing the opposite side of the cable bracket shown in FIG. 1.
Figure 3:
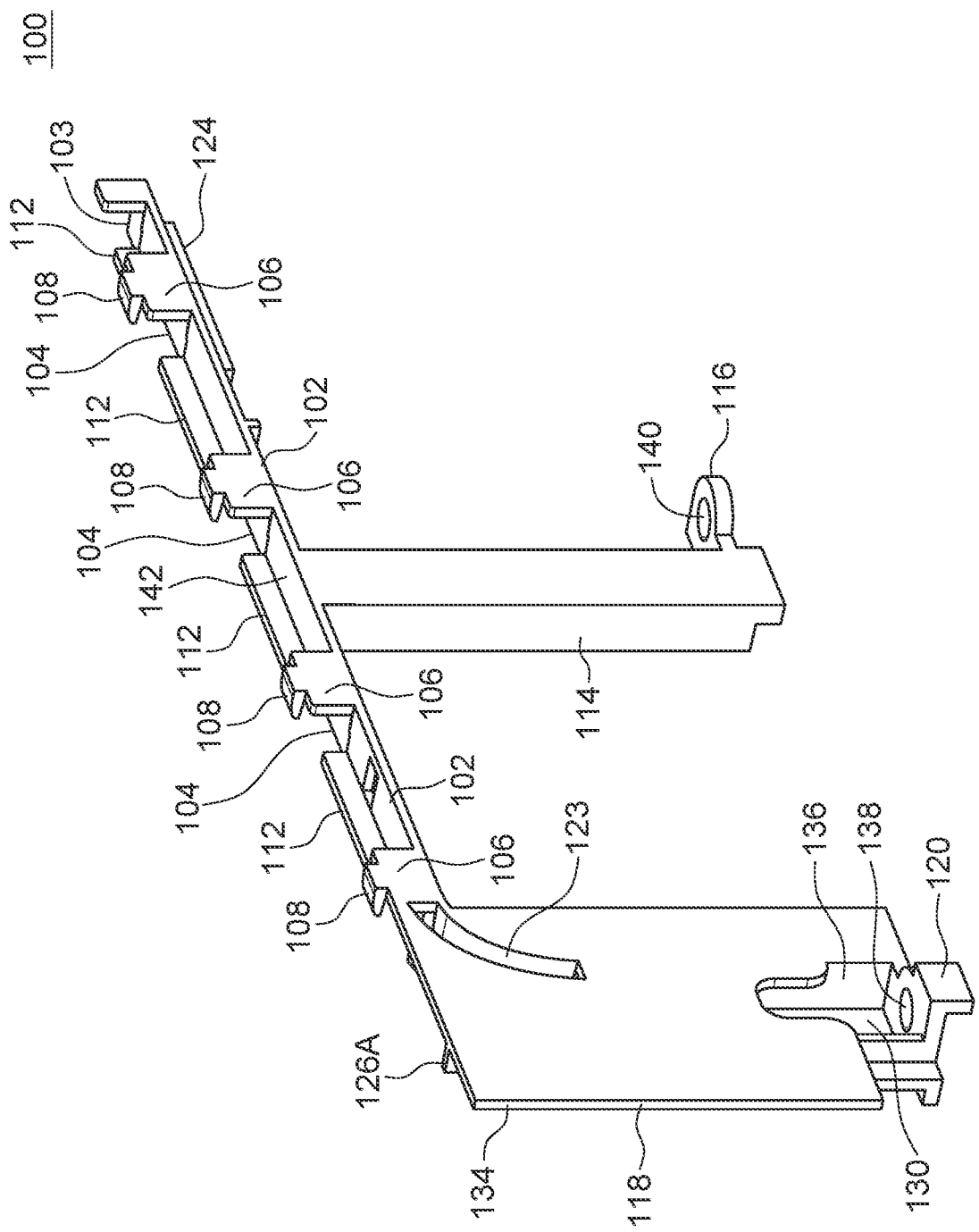
FIG. 3 shows a perspective view of the second side of the cable bracket shown in FIG. 2.
Figure 4:
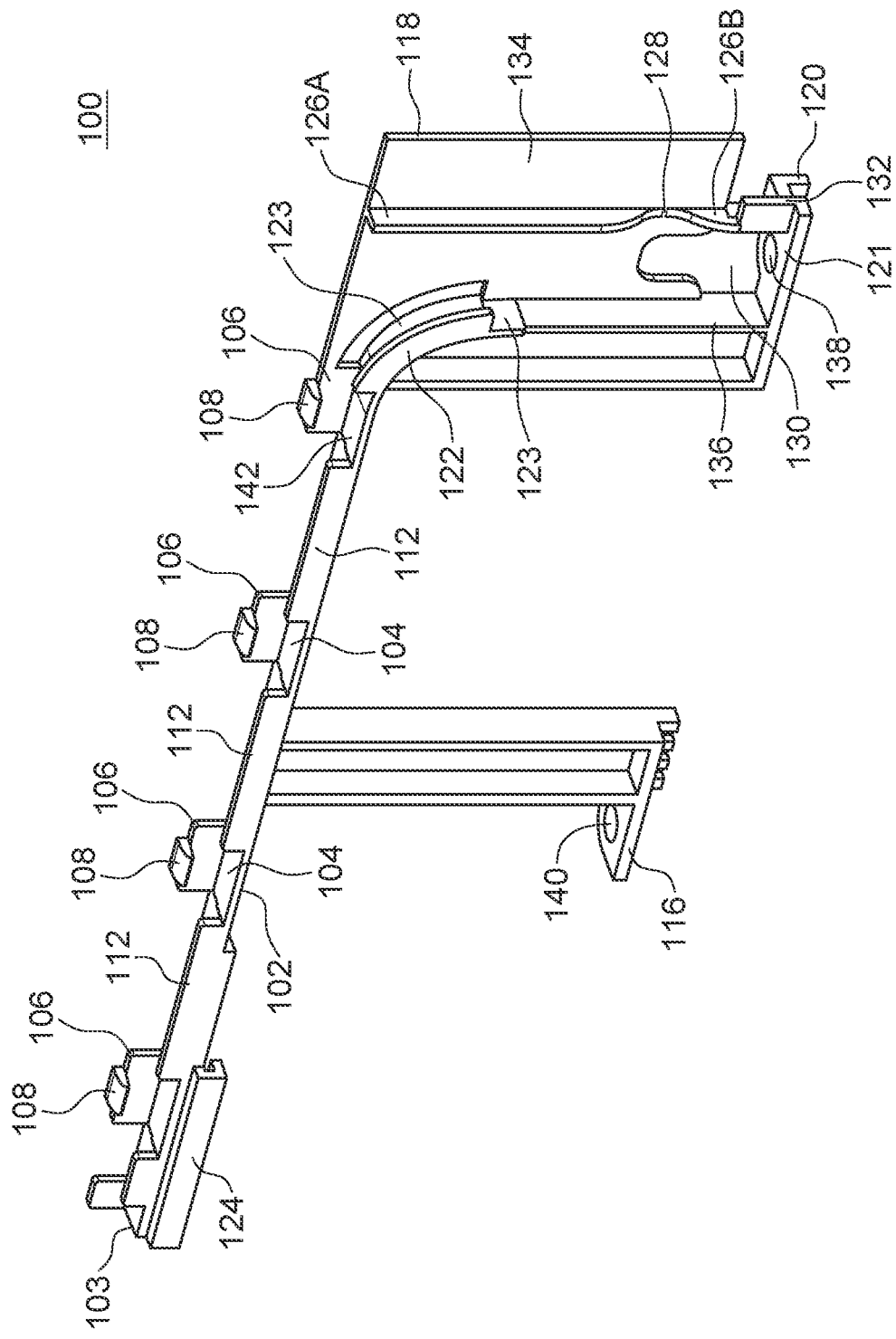
FIG. 4 shows a perspective view of the first side of the cable bracket shown in FIG. 1.

FIG. 1 is a first side view of a cable bracket 100 for use in an electronic device, such as a small cell access node device, in accordance with some embodiments of the present disclosure. FIGS. 2-4 show alternative views of the exemplary cable bracket 100, wherein FIG. 2 shows a second side view of the cable bracket 100 that is the opposite side of the cable bracket 100 of that shown in FIG. 1, FIG. 3 shows a perspective view of the second side of the cable bracket 100, and FIG. 4 shows a perspective view of the first side of the cable bracket 100. All of FIGS. 1-4 can be referred to in the description of the antenna cable bracket 100. The cable bracket 100 both provides a route for an cable, such as an antenna cable, and secures the cable in place. This ensures that during manufacture, shipment and installation of a device in which the cable bracket 100 is used, the cable is consistently positioned from each manufactured unit to the next. As a result, each manufactured device may have consistent radio signal response and be free of effects that could cause undesirable radio signal response, such as intermodulation products. The cable bracket 100 may direct the cable over one antenna element and to a second antenna element at which the antenna cable is terminated, and the antenna cable has a particular orientation relative to those antenna elements.

According to one exemplary embodiment, the cable bracket 100 comprises an elongated top rail member 102 that extends from a first end 103 to a panel section 118 at an opposite end of the top rail member 102. The top rail member 102 has a length that runs from the first end 103 to the curved rail member 123, which defines a length direction for reference to other structures of the cable bracket 100. The top rail member 102 has a surface 142 on which the cable is laid and held. The surface 142 may be generally flat and has a width that is substantially equal to the outside diameter of the cable. Along the first side edge of the top rail member 102, there may be included edge retention members 112 (e.g., tabs) that extend upward at a substantially right angle to the rail member's surface 142. The edge retention members 112 act as a barrier to retain the cable on the surface 142 of the top rail member 102 and can extend upward from the surface 142 to a height that is in the range of one half the width of the top surface member 142 to the outside diameter of the cable. The edge retention members 112 on the first side edge of the top rail member 102 may function in conjunction with opposing edge retention members 106 on the second side edge of the top rail member 102 to retain the cable on the surface 142 of the top rail member 102 between the edge retention members 106, 112. To capture the cable on the surface 142 of the top rail member 102, the opposing edge retention members 106 on the second side edge of the top rail member 102 extend vertically a distance that is about equal to an outside diameter of the cable, or the width of the top rail member's surface 142. Further, at the top of each opposing edge retention member 106 on the second side edge, there may be included a horizontal extension or cover member 108 that extends from the top of a respective edge retention member 106 over the surface 142 of the top rail member 102 to about halfway across the width of the surface 142 or more. Thus, a cable fits along the surface 142 of the top rail member 102 between the edge retention members 106, 112, and under the cover members 108. To allow placement of the cable onto the top rail member 102, the edge retentions members 106, 112 on each side may alternate. That is, where there is an edge retention member 112 on the first side edge of the top rail member 102, there is no edge retention member 106 on the second side edge of the top rail member 102 opposite that edge retention member 112. Likewise, there may be a gap 104 or space at the first side edge across the top rail member 102 from each edge retention member 106 on the second side edge of the top rail member 102. This arrangement of the edge retention members 106, 112 allows a cable to be "snaked" in between the edge retention members 106, 112 and under the cover members 108 along the surface 142 of the top rail member 102 during assembly of the electronic device.

FIGS. 9A and 9B show exemplary cutaway views taken along section lines A-A' and B-B' in FIG. 1, respectively. In FIG. 9A, there is shown a portion of the top rail member 102 where the section is taken through an edge retention member 106 and a cover member 108, in relation to a cable 160 that is routed along the surface 142 of the top rail member 102. The edge retention member 106 on the second side edge of the top rail member 102 prevents the cable 160 from moving to the right (i.e., past the edge retention member 106), and the cover member 108 prevents the cable 160 from traveling upward. Similarly, in FIG. 9B, the cable 160 is bounded by edge retention member 112 on the first side edge of the top rail member 102. The alternating occurrence of the edge retention members 106, 112 along the side edges of the top rail member 102 allows the cable 160 to be placed onto the surface 142 of the top rail member 102 and retain the cable 160 without the need for a structure, such as a tunnel or tube. The disclosed arrangement reduces the amount of material needed to retain the cable 160 and hold it in place along the top rail member 102, and therefore reduces the weight of the cable bracket 100 over more conventional structures for retaining and holding a cable in place along a route. At the same time, the cable bracket 100 eliminates the need for manual operations, such as applying a cable tie to hold the cable 160 in place, which, being a manual operation, can introduce undesired variability into the manufacturing process.

At about the midpoint of the top rail member 102, the cable bracket 100 may include a support leg 114 that extends downward. At the bottom of the support leg 114 a fastener support may be included that has flat base portion 116 of material extending horizontally from the bottom of the support leg 114. The base portion 116 may include or define an opening 140 therethrough that is sized to allow the shank of a fastener, such as a screw or bolt, to pass through to fasten the support leg 114 to a support structure, such as, for example, the floor of the housing of an electronic device.

At the end of the top rail member 102 opposite the first end 103 in the lengthwise direction of the cable bracket 100, there may be includes a panel member 118 having a generally flat section extending from the second edge side of the top rail member 102 in the elongated direction of the top rail member 102. The panel member 118 may include or support a curved rail member 123 that is coupled to an end of the top rail member 102 and turns downward. As shown in exemplary form, the curved rail member 123 traverses about a ninety-degree arc from the horizontal direction of the top rail member 102 to a direction of a vertical rail member 136 coupled to the bottom end of the curved rail member 123. The vertical rail member 136 extends the panel member 118 perpendicularly toward the first side of the cable bracket 100. The curved rail member 123 has a radius that is larger than an outside diameter of the cable routed over it to minimize mechanical stress exerted on the cable as it transitions from the horizontal direction of the top rail member 102 to the vertical direction of the vertical rail member 136. A curved edge retention member 122 may extend perpendicularly from the outside edge of the curved rail member 123 on the first side in order to retain the cable on the surface of the curved rail member 123.

Spaced apart from the vertical rail member 136 may be an alignment member having an upper portion 126A and a lower portion 126B, which may both be vertically oriented. Both the upper portion 126A and the lower portion 126B of the alignment member may extend from the panel member 118 perpendicularly toward the first side of the cable bracket 100 by a distance that is substantially equal to the width of the top rail member 102 along most of their respective lengths along the panel member 118. At a point below the bottom of the curved rail member 123, the upper and lower alignment member sections 126A, 126B may reduce or taper to form a passage 128. That is, the vertical outside edges of the alignment member sections 126A, 126B may taper toward the panel member 118 to be flush with the panel member 118 at the vertical midpoint of the passage 128. Between the alignment member sections 126A, 126B and the vertical rail member 136, at the bottom of the panel member 118, an opening 130 may be included to allow access to the bottom 121 of the panel member 118, which may include a horizontally oriented surface portion across the bottom of the panel member 118 and which may include a lower guide tab section 120 that extends perpendicularly away from the bottom at the second side of the cable bracket 100 in a direction away from the first side of the cable bracket 100 and downward. A fastener opening 138 may be included through the floor 121 to allow a fastener to fasten the panel member to a support structure.

Upon installation of the cable bracket 100, a vertical edge of a planar antenna bracket may be aligned vertically along the alignment member portions 126A, 126B, and a distal section 134 of the panel member 118 may extend behind the antenna bracket, while a capture tab 132 at the bottom of the lower alignment member portion 126B may extend in front of the antenna bracket, as shown in FIGS. 3 and 4. At the first end 103 of the top rail member 102, along the first side of the cable bracket 100, an antenna bracket capture section 124 may be included that extends along the first side of the top rail member 102 and downward vertically, and turns inward toward the second side of the cable bracket 100 to from a "C" shape in which the top horizontal portion an antenna bracket may be retained, as discussed below.

Figure 5:
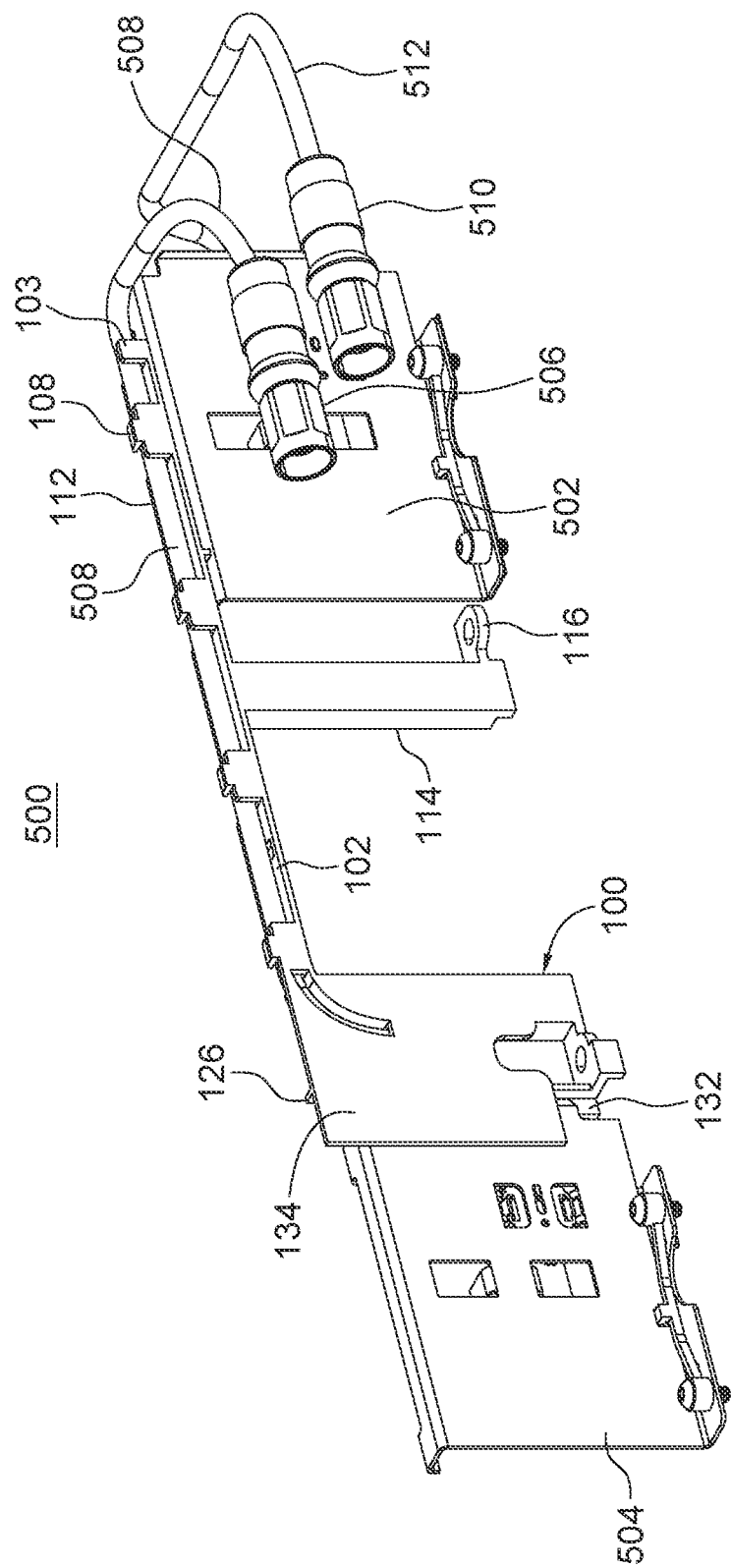
FIG. 5 shows a perspective view a cable guide system including an antenna cable bracket, in accordance with alternative exemplary embodiments of the present disclosure.

FIG. 5 shows a perspective view of an exemplary guide system 500 for an antenna cable 508. The guide system 500 includes a cable bracket 100 and an antenna bracket 504, in accordance with some embodiments of the present disclosure. The cable bracket 100 routes the antenna cable 508 to/from the antenna bracket 504, which route may pass over a second antenna bracket 502. The antenna brackets 502, 504 may be made of electrically conductive material, be planar in a vertical direction, and have vertical planar antenna elements 602 (shown in FIG. 6) mounted on their outward facing sides. A portion of the top rail member 102, from the first end 103, may run along the top of the second antenna bracket 502. The two antenna brackets 502, 504 may be separated for spatial diversity, such that the top rail member 102 continues across the gap or space between the antenna brackets 502, 504. The panel member 118 may be positioned adjacent the antenna bracket 504, with a distal section 134 of the panel member 118 extending partly behind the antenna bracket 504. The antenna cable 508 may be held in place by the edge retention members 106, 112 and the cover members 108 along the top rail member 102 of the cable bracket 100. The antenna cable 508 is coupled, at one end, to a connector 506 that may be used to connect the antenna cable 508 to a radio transceiver. A second antenna cable 512 may be connected to an antenna element supported by antenna bracket 502 and to connector 510. Antenna cable 508 is terminated at an antenna element 602 that is supported by the antenna bracket 504, as shown in FIG. 6.

Figure 6:
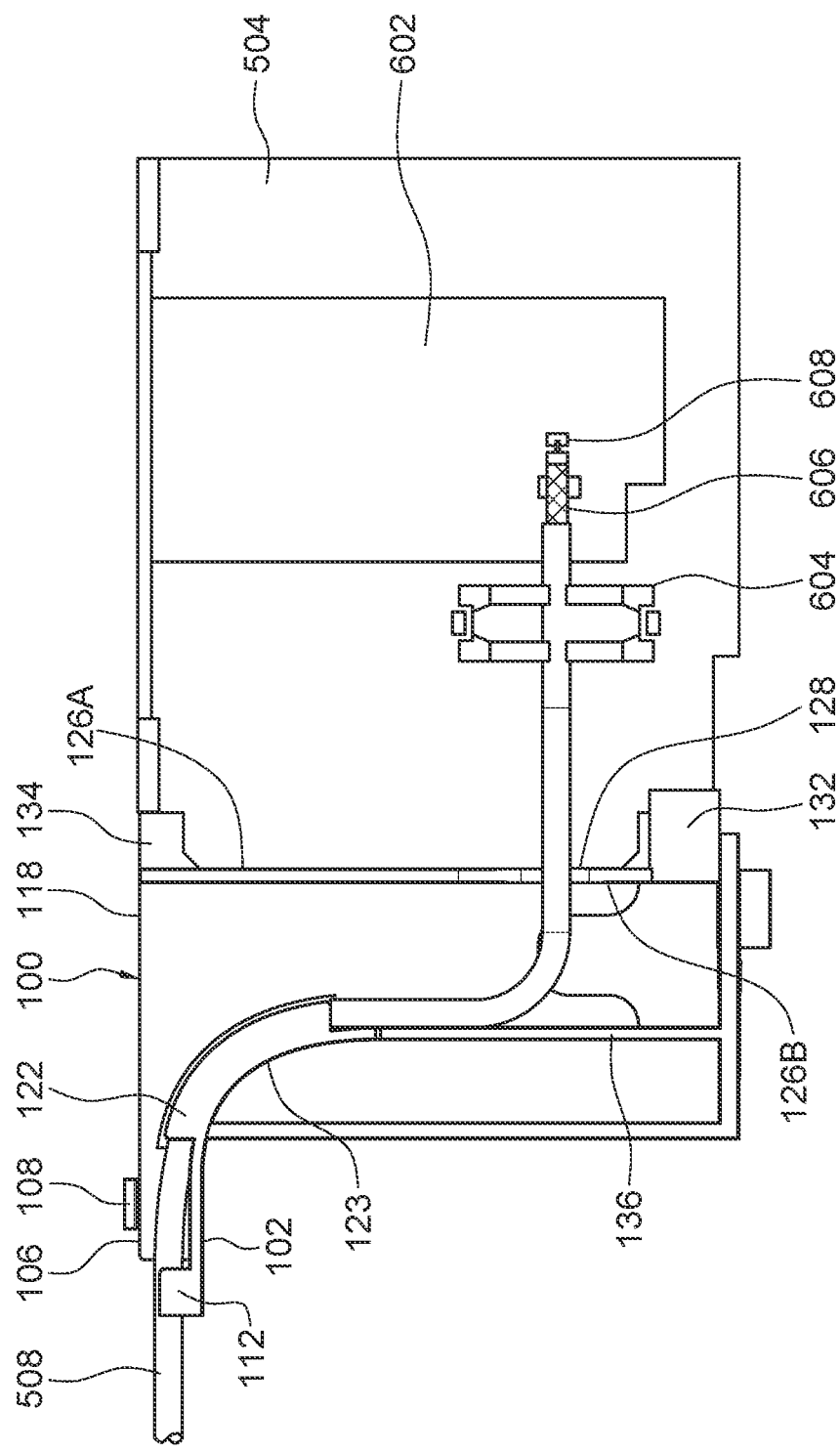
FIG. 6 shows a first side detail view of an antenna element in conjunction with an antenna cable bracket, in accordance with some exemplary embodiments of the present disclosure.

FIG. 6 shows a first side detail view of the antenna element 602 that is supported on the antenna bracket 504, in accordance with some embodiments of the present disclosure. This view shows the opposite side of that shown in FIG. 5. The antenna element 602 may be a planar antenna that includes a radiating conductor element that is oriented in a vertical plane parallel to the vertical plane defined by the antenna bracket 504 and the panel member 118 of the cable bracket 100. The antenna cable 508 is routed along the top rail member 102, over the curved rail member 123, along the vertical rail member 136, and then through the passage 128 in the alignment member to the antenna bracket 504 where the cable 508 may be held by a retention clip 604. The end of the antenna cable 508 is exposed such that the outer ground shielding 606 is connected to a ground connector on the antenna element 602 and the center conductor of the antenna cable 508 is connected to a conductor pad 608 that is electrically connected to the radiating element of the antenna element 602. The capture tab 132 of the cable bracket 100 extends from the bottom of the alignment member's lower portion 126B in a direction toward the antenna bracket 504. As a result, the antenna bracket 504 is partially retained between the distal section 134 and the capture tab 132, and the vertical end of the antenna bracket 504 may abut the alignment member portions 126A, 126B.

Figure 7:
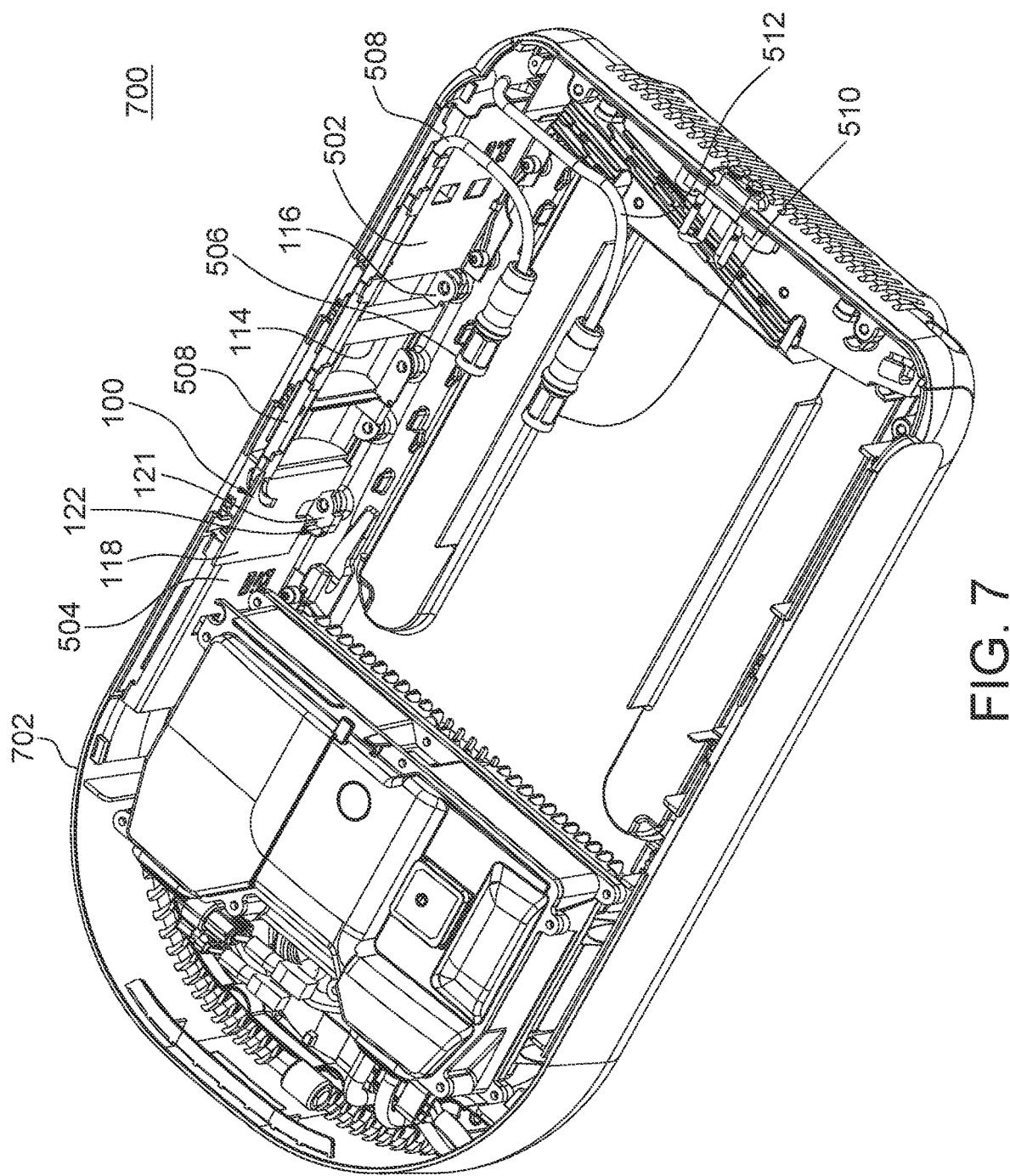
FIG. 7 shows a perspective view of an exemplary electronic device in a first stage of assembly, in accordance with some exemplary embodiments of the present disclosure.
Figure 8:
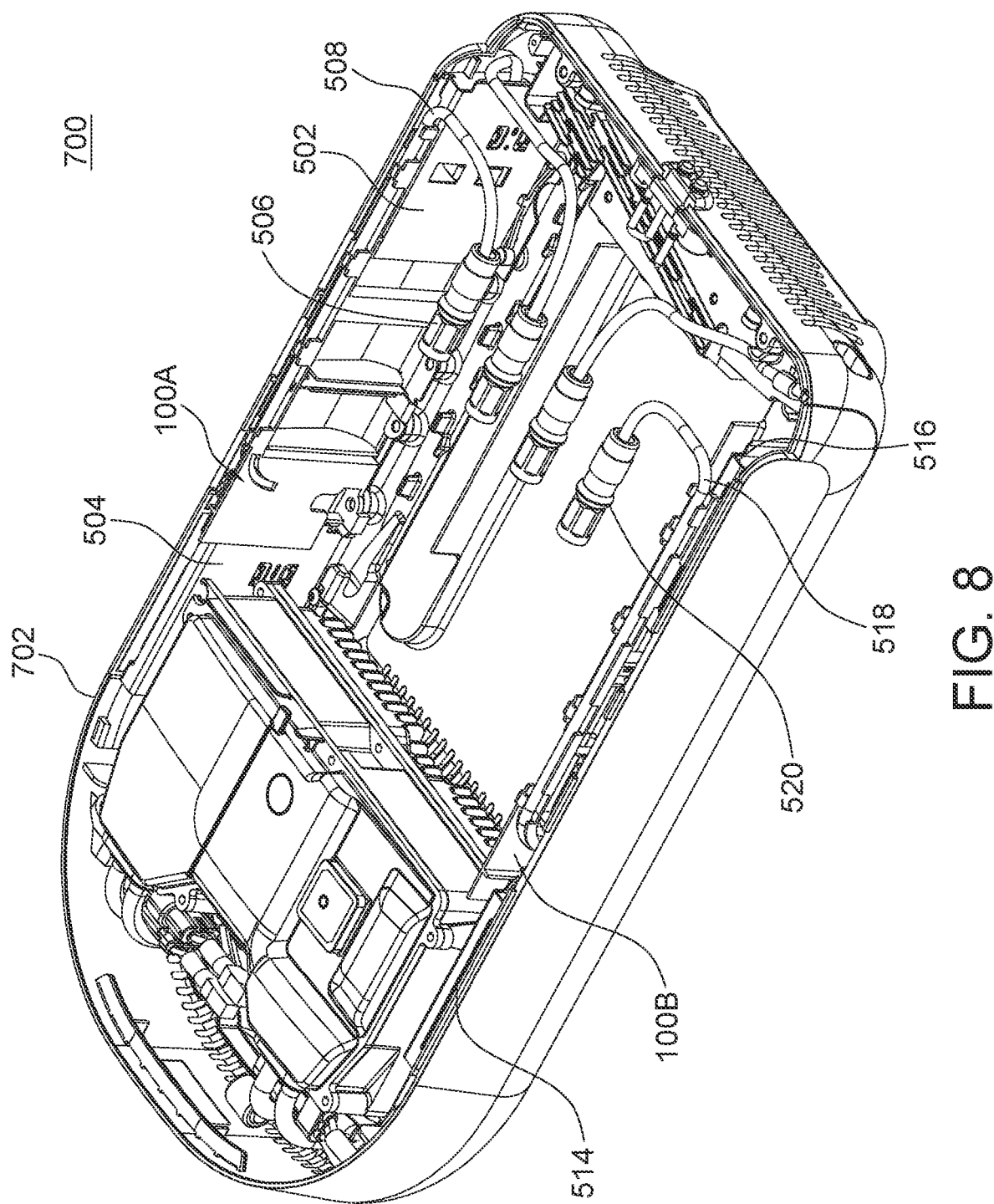
FIG. 8 shows a perspective view of the electronic device of FIG. 7 in a second stage of assembly.

FIG. 7 shows a perspective view of an electronic device 700, such as a small cell access node device, an IoT device, or an IIoT device, in a first stage of assembly. The electronic device 700 includes a housing 702 into which the antenna brackets 502, 504 are mounted, with fasteners being used at their bottoms to secure them to a support structure of the device housing 702. Likewise, the cable bracket 100 may be coupled with fasteners to the device housing 702, such as through openings 140 in the cable bracket support legs 114. FIG. 8 shows a perspective view of the electronic device 700 of FIG. 7 in a second stage of assembly with additional antenna brackets 514, 516 and a second cable bracket 100B that routes another antenna cable 518 from connector 520 to antenna bracket 514. The device embodiment illustrated in FIG. 8 may be used for a 4×4 MIMO small cell access node device.

In accordance with one exemplary embodiment of the present disclosure, a bracket 100 that provides a guide path for a cable, such as an antenna cable 508 or any other cable that may require more precise routing, includes multiple rail members 102, 123, 136 and edge retention members 106, 112. A first rail member 136 is oriented in a first direction and configured to support a first section of the cable 508. A second rail member 123 is coupled at a first end to the first rail member 136 and configured to support a second section of the cable 508. The second rail member 123 is curved and provides a transition from the first direction to a second direction (e.g., a 45-degree transition, a 90-degree transition, or any other directional transition). A third rail member 102 is coupled to a second end of the second rail member 123 and configured to support a third section of the cable 508. At least part of the third rail member 102 is oriented in the second direction (e.g., along the sidewall of an electronic device housing 702). The edge retention members 106, 112 are coupled to at least one side edge of the third rail member 102 and spaced along a length of the third rail member 102. The edge retention members 106, 112 are oriented so as to retain at least part of the third section of the cable 508 on a surface 142 of the third rail member 102. For example, the edge retention members 106, 112 may be oriented substantially perpendicular to the surface 142 of the third rail member 102. Alternatively, the edge retention members 106, 112 may be oriented at other angles relative to the surface 142 of the third rail member 102 so long as such angles are adequate to retain at least part of the third section of the cable 508 on the surface 142 of the third rail member 102 without crimping or pinching the cable 508. The edge retention members 106, 112 may be integrated with (e.g., molded), attached to, or otherwise coupled to the third rail member 102. According to one embodiment, the entire cable bracket 100 may be a single molded, non-conductive, rigid plastic component.

According to an alternative exemplary embodiment of the present disclosure, the edge retention members 106, 112 may be located on both side edges of the third rail member 102. In one exemplary embodiment, the edge retention members 106, 112 are located on both side edges of the third rail member 102 in an alternating manner so as to form gaps 104 between each pair of edge retention members 106, 112 on a particular side edge of the third rail member 102. Additionally, the lengths of the edge retention members 106, 112 may be different on one side edge of the third rail member 102 than on the other side edge. For example, as illustrated in FIGS. 1-4, retention members 112 are longer than retention members 106. The gaps 104 between the edge retention members 106, 112 may allow finger or tool access to the cable 508 from a side of the third rail member 102.

According to another alternative exemplary embodiment of the present disclosure, the cable bracket 100 may also include a plurality of cover members 108 coupled to at least two of the edge retention members 106. The cover members 108 are oriented so as to reside over at least part of a width of the surface 142 of the third rail member 102. For example, each cover member 108 may be an extension or hood extending from a top edge of the edge member 106 to or with which the cover member 108 is integrated (e.g., molded), attached, or otherwise coupled. The cover members 108 may prevent the cable 508 from falling off the third rail member 102 in the event an electronic device 700 that includes the cable bracket 100 is turned upside down, such as during shipping or installation. In one exemplary embodiment, the third rail member 102 is the longest of the rail members 102, 123, 136.

Edge retention members and/or cover members 108 may also be coupled to one or more of the other rail members 123, 136. For example, a curved edge retention member 122 may be coupled to one side edge or each side edge of the second rail member 123, where the curved edge retention member 122 is oriented so as to retain at least part of the second section of the cable 508 on a surface of the second rail member 123. A cover member 108 (not shown) may be coupled to a top edge of the curved edge retention member 122 and be oriented so as to reside over at least part of a width of a surface of the second rail member 123.

According to another alternative embodiment, the cable bracket 100 may further include one or more support legs 114 that are attachable to a support structure, such as part of a housing 702 (e.g., a standoff on the floor, ceiling, or cover) of an electronic device 700 in which the cable bracket 100 is installed. The support legs 114 may be coupled to the third rail member 102 and be used in circumstances where the third rail member 102 is elevated relative to a floor or ceiling of the electronic device's housing 702. The support legs 114 may include base portions 116 that define openings 140 through which shanks of fasteners, such as screws or bolts, may be inserted to attach and secure the support legs 114 to the support structure 702.

According to yet another alternative embodiment, the cable bracket 100 may include an alignment member (126A, 126B) spaced apart from and substantially parallel to the first rail member 136. In such a case, the alignment member may define an alignment passage 128 for the cable 508. For example, the alignment member may be positioned between a cable termination point 608, such as where the cable 508 is secured (e.g., soldered, glued, connected to a connector, etc.) to a printed circuit board 602, and the first rail member 136 to guide the cable 508 from the termination point 608 to the first rail member 136. The alignment member may be used where inclusion of another rail member from the termination point 608 to the first rail member 136 is not practical or feasible. The alignment member may include or define an opening or another passage 128 (e.g., a recess or other guide structure) through which the cable 508 may pass to ensure the cable section to be carried by the first rail section 136 approaches the first rail section 136 at a desired location and angle. The alignment member, the first rail member 136, and/or the second rail member 123 may be included on or form part of a panel member 118, which may reside adjacent to a module or printed circuit board at which one end of the cable 508 is terminated. For example, where the module is an antenna element 602, the panel member 118 of the cable bracket 100 may be positioned adjacent to the module 602 thereby positioning the alignment member 126A, 126B, the first rail member 136, and/or the second rail member 123 in desired positions for cable routing. The panel member 118 provides a predetermined support structure for whichever cable bracket member or members (e.g., the alignment member, the first rail member 136, and/or the second rail member 123) are integrated with, attached to, or otherwise coupled to the panel member 118.

According to another alternative embodiment, a guide system 500 for an antenna cable 508 that is coupled at one end to an antenna element 602 includes an antenna bracket 504 and a cable bracket 100. The antenna bracket 504 supports the antenna element 602. The cable bracket 100 includes multiple rail members 102, 123, 136 and edge retention members 106, 112. A first rail member 136 is spaced apart from the antenna element 602, oriented in a first direction, and configured to support a first section of the antenna cable 508. A second rail member 123 is coupled at a first end to the first rail member 136 and configured to support a second section of the antenna cable 508. The second rail member 123 is curved and provides a transition from the first direction to a second direction (e.g., a 45-degree transition, a 90-degree transition, or any other desired directional transition). A third rail member 102 is coupled to a second end of the second rail member 123 and configured to support a third section of the antenna cable 508. At least part of the third rail member 102 is oriented in the second direction. The edge retention members 106, 112 are coupled to one or both side edges of the third rail member 102 and are spaced along a length of the third rail member 102. The edge retention members 106, 112 are oriented so as to retain at least part of the third section of the antenna cable 508 on a surface 142 of the third rail member 102. For example, the edge retention members 106, 112 may be oriented substantially perpendicular to the surface 142 of the third rail member 102. Alternatively, the edge retention members 106, 112 may be oriented at other angles relative to the surface 142 of the third rail member 102 so long as such angles are adequate to retain at least part of the third section of the antenna cable 508 on the surface 142 of the third rail member 102 without crimping or pinching the antenna cable 508. The edge retention members 106, 112 may be integrated with (e.g., molded), attached to, or otherwise coupled to the third rail member 102. According to one embodiment, the cable bracket 100 may be a molded, non-conductive (e.g., plastic) component.

According to an alternative embodiment, the antenna bracket 504 may include a retention clip 604. When included, the retention clip 604 retains a portion of the antenna cable 508 in a fixed position after the antenna cable 508 is connected (e.g., soldered) to the antenna element 602. The retention clip 604 functions to reduce or eliminate stress imposed on the area at which the antenna cable 508 connects to the antenna element 602 during routing of the remainder of the antenna cable 508 through the rest of the cable guide system.

According to yet another alternative embodiment, the cable bracket 100 of the guide system 500 may include an alignment member 126A, 126B spaced apart from and substantially parallel to the first rail member 136. In such a case, the alignment member may define an alignment passage 128 for the antenna cable 508. For example, the alignment member 126A, 126B may be positioned between a cable termination point 608, such as where the antenna cable 508 is secured (e.g., soldered, glued, connected to a connector, etc.) to the antenna element 602, and the first rail member 136 to guide the antenna cable 508 from the termination point 608 to the first rail member 136. The alignment member may be used where inclusion of another rail member from the termination point 608 to the first rail member 136 is not practical or feasible. The alignment member may include or define an opening or another passage 128 (e.g., a recess or other guide structure) through which the antenna cable 508 may pass to ensure the antenna cable section to be carried by the first rail section 136 approaches the first rail section 136 at a desired location and angle. The alignment member 126A, 126B, the first rail member 136, and/or the second rail member 123 may be included on or form part of a panel member 118, which may reside adjacent to the antenna bracket 504. The panel member 118 provides a predetermined support structure for whichever cable bracket member or members (e.g., the alignment member 126A, 126B, the first rail member 136, and/or the second rail member 123) are integrated with, attached to, or otherwise coupled to the panel member 118.

According to another alternative exemplary embodiment of the present disclosure, the cable bracket 100 of the guide system 500 may also include a plurality of cover members 108 coupled to at least two of the edge retention members 106, 112. The cover members 108 are oriented so as to reside over at least part of a width of the surface 142 of the third rail member 102. For example, each cover member 108 may be an extension or hood extending from a top edge of the edge member 106, 112 to or with which the cover member 108 is integrated (e.g., molded), attached, or otherwise coupled. The cover members 108 may prevent the antenna cable 508 from falling off the third rail member 102 in the event the electronic device 700 that includes the guide system 500 is turned upside down, such as during shipping or installation. In one exemplary embodiment, the third rail member 102 is the longest of the rail members.

Edge retention members 106, 112, 122 and/or cover members 108 may also be coupled to one or more of the other rail members 123, 136. For example, a curved edge retention member 122 may be coupled to one side edge or each side edge of the second rail member 123, where the curved edge retention member 122 is oriented so as to retain at least part of the second section of the antenna cable 508 on a surface of the second rail member 123. A cover member 108 may be coupled to a top edge of the curved edge retention member 122 and be oriented so as to reside over at least part of a width of a surface of the second rail member 123.

According to another alternative embodiment, the cable bracket 100 of the guide system 500 may further include one or more support legs 114 that are attachable to a support structure, such as part of a housing 702 (e.g., the floor, ceiling, or cover) of an electronic device 700 in which the guide system 500 is installed. The support legs 114 may be coupled to the third rail member 102 and be used in circumstances where the third rail member 102 is elevated relative to a floor or ceiling of the electronic device's housing 702. The support legs 114 may include base portions 116 that define openings 140 through which shanks of fasteners, such as screws or bolts, may be inserted to attach and secure the support legs 114 to the support structure 702.

According to yet another alternative embodiment, an electronic device 700, such as a small cell access node device, an IoT device, or an IIoT device, includes a housing 702, an antenna element 602, an antenna cable 508, an antenna bracket 504, and a cable bracket 100. The antenna cable 508 connects to the antenna element 602 at one end and may include an attached connector 506 at another end. The antenna bracket 504 is positioned within the housing 702 and supports the antenna element 602. The cable bracket 100 is also positioned within the housing 702 and includes multiple rail members 102, 123, 136 and edge retention members 106, 112. A first rail member 136 is spaced apart from the antenna element 602, oriented in a first direction, and configured to support a first section of the antenna cable 508. A second rail member 123 is coupled at a first end to the first rail member 136 and configured to support a second section of the antenna cable 508. The second rail member 123 is curved and provides a transition from the first direction to a second direction (e.g., a 45-degree transition, a 90-degree transition, or any other desired directional transition). A third rail member 102 is coupled to a second end of the second rail member 123 and configured to support a third section of the antenna cable 508. At least part of the third rail member 102 is oriented in the second direction. The edge retention members 106, 112 are coupled to one or both side edges of the third rail member 102 and are spaced along a length of the third rail member 102. The edge retention members 106, 112 are oriented so as to retain at least part of the third section of the antenna cable 508 on a surface 142 of the third rail member 102. For example, the edge retention members 106, 112 may be oriented substantially perpendicular to the surface 142 of the third rail member 102. Alternatively, the edge retention members 106, 112 may be oriented at other angles relative to the surface of the third rail member 102 so long as such angles are adequate to retain at least part of the third section of the antenna cable 508 on the surface 142 of the third rail member 102 without crimping or pinching the antenna cable 508. The edge retention members 106, 112 may be integrated with (e.g., molded), attached to, or otherwise coupled to the third rail member 102. According to one embodiment, the entire cable bracket 100 may be a single molded, non-conductive (e.g., plastic) component.

In an alternative embodiment, the electronic device 700 may include multiple antenna elements 602, multiple antenna cables 508, and multiple antenna brackets 504, such as where the electronic device 700 uses a 2×2, 4×4, or 8×8 multiple-input-multiple-output (MIMO) antenna element arrangement. In such a case, the electronic device 700 may include one or more cable brackets 100 to at least partially route one or more of the antenna cables 508 between its associated antenna element 602 and an attachment point, such as a radio transceiver.

The claims appended hereto are meant to cover all modifications and changes within the scope and spirit of the present invention.

What is claimed is:

1. A bracket that provides a guide path for a cable, the bracket comprising:
    a first rail member oriented in a first direction and configured to support a first section of the cable;
    a second rail member coupled at a first end to the first rail member and configured to support a second section of the cable, the second rail member being curved and providing a transition from the first direction to a second direction;
    a third rail member coupled to a second end of the second rail member and configured to support a third section of the cable, at least part of the third rail member being oriented in the second direction; and
    a plurality of edge retention members coupled to at least one side edge of the third rail member and spaced along a length of the third rail member, the plurality of edge retention members being oriented so as to retain at least part of the third section of the cable on a surface of the third rail member.

2. The bracket of claim 1, wherein the edge retention members are oriented substantially perpendicular to the surface of the third rail member.

3. The bracket of claim 1, wherein the edge retention members are located on both side edges of the third rail member.

4. The bracket of claim 3, wherein the edge retention members are located on both side edges of the third rail member in an alternating manner so as to form gaps between each pair of edge retention members on a particular side edge of the third rail member.

5. The bracket of claim 1, further comprising:
    a plurality of cover members coupled to at least two of the edge retention members, the cover members being oriented so as to reside over at least part of a width of the surface of the third rail member.

6. The bracket of claim 1, further comprising:
    a curved edge retention member coupled to a side edge of the second rail member, the curved edge retention member being oriented so as to retain at least part of the second section of the cable on a surface of the second rail member.

7. The bracket of claim 1, wherein the cable is an antenna cable.

8. The bracket of claim 1, further comprising:
    at least one support leg coupled to the third rail member, the at least one support leg being attachable to a support structure.

9. The bracket of claim 1, further comprising:
    an alignment member spaced apart from and substantially parallel to the first rail member, the alignment member defining an alignment passage for the cable.

10. The bracket of claim 9, further comprising:
    a panel member to which at least the first rail member and the alignment member are coupled.

11. The bracket of claim 10, the second rail member is coupled to the panel member.

12. A guide system for an antenna cable that is coupled at one end to an antenna element, the guide system comprising:
    an antenna bracket that supports the antenna element; and
    a cable bracket that includes:
        a first rail member spaced apart from the antenna element, oriented in a first direction, and configured to support a first section of the antenna cable;
        a second rail member coupled at a first end to the first rail member and configured to support a second section of the antenna cable, the second rail member being curved and providing a transition from the first direction to a second direction;
        a third rail member coupled to a second end of the second rail member and configured to support a third section of the antenna cable, at least part of the third rail member being oriented in the second direction; and
        a plurality of edge retention members coupled to at least one side edge of the third rail member and spaced along a length of the third rail member, the plurality of edge retention members being oriented so as to retain at least part of the third section of the antenna cable on a surface of the third rail member.

13. The guide system of claim 12, wherein the cable bracket further includes:
    an alignment member positioned between the antenna element and the first rail member, the alignment member being substantially parallel to the first rail member and defining an alignment passage for the antenna cable.

14. The guide system of claim 13, wherein the cable bracket further includes:
    a panel member that includes at least the first rail member and the alignment member.

15. The guide system of claim 14, wherein the panel member further includes the second rail member.

16. The guide system of claim 12, wherein the edge retention members are oriented substantially perpendicular to the surface of the third rail member.

17. The guide system of claim 12, wherein the edge retention members are located on both side edges of the third rail member.

18. The guide system of claim 12, wherein the cable bracket further includes:
    a plurality of cover members coupled to at least two of the edge retention members, the cover members being oriented so as to reside over at least part of a width of the surface of the third rail member.

19. The guide system of claim 12, further comprising:
    at least one support leg coupled to the third rail member, the at least one support leg being attachable to a support structure.

20. An electronic device comprising:
    a housing;
    an antenna element;
    an antenna cable that connects to the antenna element at one end and includes an attached connector at another end;

an antenna bracket positioned within the housing and supporting the antenna element; and a cable bracket positioned within the housing and including:
- a first rail member spaced apart from the antenna element, oriented in a first direction, and configured to support a first section of the antenna cable;
- a second rail member coupled at a first end to the first rail member and configured to support a second section of the antenna cable, the second rail member being curved and providing a transition from the first direction to a second direction;
- a third rail member coupled to a second end of the second rail member and configured to support a third section of the antenna cable, at least part of the third rail member being oriented in the second direction; and
- a plurality of edge retention members coupled to at least one side edge of the third rail member and spaced along a length of the third rail member, the plurality of edge retention members being oriented so as to retain at least part of the third section of the antenna cable on a surface of the third rail member.

* * * * *